(12) United States Patent
Bawolek et al.

(10) Patent No.: US 10,915,771 B2
(45) Date of Patent: Feb. 9, 2021

(54) METHOD AND APPARATUS FOR SECURING A CAPTURED FINGERPRINT

(71) Applicant: Integrated Biometrics, LLC, Spartanburg, SC (US)

(72) Inventors: Edward John Bawolek, Chandler, AZ (US); Douglas E. Loy, Gilbert, AZ (US); Suzan Jane Bawolek, Chandler, AZ (US)

(73) Assignee: Integrated Biometrics, LLC, Spartanburg, SC (US)

( * ) Notice: Subject to any disclaimer, the term of this patent is extended or adjusted under 35 U.S.C. 154(b) by 81 days.

(21) Appl. No.: 15/894,930

(22) Filed: Feb. 13, 2018

(65) Prior Publication Data

US 2019/0251379 A1 Aug. 15, 2019

(51) Int. Cl.
| | |
|---|---|
| *G06K 9/00* | (2006.01) |
| *G06K 19/06* | (2006.01) |
| *H04L 9/30* | (2006.01) |
| *H04L 9/08* | (2006.01) |

(52) U.S. Cl.
CPC ....... *G06K 9/00892* (2013.01); *G06K 9/0004* (2013.01); *G06K 9/00087* (2013.01); *G06K 9/00617* (2013.01); *G06K 19/06028* (2013.01); *G06K 19/06037* (2013.01); *H04L 9/08* (2013.01); *H04L 9/30* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,812,252 | A | * 9/1998 | Bowker | F41A 17/066 356/71 |
| 6,182,892 | B1 | * 2/2001 | Angelo | G06K 9/00046 235/380 |
| 2004/0181671 | A1 | * 9/2004 | Brundage | G06T 1/0071 713/176 |
| 2009/0073141 | A1 | * 3/2009 | Chino | G06F 3/042 345/175 |
| 2011/0213700 | A1 | * 9/2011 | Sant'Anselmo | G06Q 10/10 705/39 |
| 2012/0218079 | A1 | * 8/2012 | Kim | G06F 21/32 340/5.83 |
| 2015/0365388 | A1 | * 12/2015 | Little | G06Q 50/265 726/7 |
| 2017/0063852 | A1 | * 3/2017 | Azar | G07C 9/37 |
| 2018/0082050 | A1 | * 3/2018 | Flink | G06F 21/32 |
| 2019/0080065 | A1 | * 3/2019 | Sheik-Nainar | G06K 9/00248 |

OTHER PUBLICATIONS

Google Scholar Search Report.*

* cited by examiner

*Primary Examiner* — Qun Shen
(74) *Attorney, Agent, or Firm* — Tucker Ellis LLP; Heather M. Barnes; Michael G. Craig (57) ABSTRACT

A system for securing a fingerprint identification artifact comprises an electro-optical material which captures a static fingerprint image and an electrode array for encoding a security code onto the electro-optical material. The security code can be encrypted to prevent unauthorized reading and can further incorporate biometric data based upon the acquired fingerprint, an iris scan, or other attributes unique to an individual. The identification artifact so created can be removed from the system for archival or for use in verifying identity.

12 Claims, 6 Drawing Sheets

METHOD AND APPARATUS FOR SECURING A CAPTURED FINGERPRINT

CROSS REFERENCE TO RELATED APPLICATIONS

This application is a continuation-in-part of, and claims benefit to, U.S. patent application Ser. No. 15/821,942, filed Nov. 24, 2017, entitled "METHOD AND APPARATUS FOR CAPTURE OF A FINGERPRINT USING AN ELECTRO-OPTICAL MATERIAL," which is incorporated herein by reference in its entirety.

TECHNICAL FIELD

The present invention is related to the capture and retention of a fingerprint image. More specifically, the present invention provides a method for the creation of a physical identification artifact having security features for authentication and to discourage and inhibit unauthorized use or duplication.

BACKGROUND ART

Fingerprints and other biometric data are of increasing interest for use in law enforcement, security, financial, and other applications. Historically, fingerprints were acquired by means of application of ink to the skin, followed by making an impression of the skin onto a sheet of paper or cardstock. A set of fingerprints acquired by this method has the advantage of providing a physical artifact which can be transported or archived without the need for an electronic support infrastructure. A disadvantage to paper-based fingerprints is that they are inconvenient to integrate into electronic systems and hence do not facilitate rapid storage, distribution, retrieval, and searching. An additional disadvantage to paper-based fingerprints is that they provide little opportunity for authentication, especially with respect to the original source of the fingerprint data. For these reasons, electronic-based fingerprint acquisition systems have become popular. A number of methods for acquiring fingerprints electronically have been developed.

SUMMARY OF THE INVENTION

The present invention presents a method and apparatus for acquiring a fingerprint image with an electro-optical material to create a physical artifact, and further encoding authentication data onto said artifact. The authentication data can comprise biometric data derived from the acquired fingerprint, an encryption code such as one based on public key/private key methods, or other validating data. The authentication data can be written onto the electro-optical material at the time of fingerprint capture, or at a later time. The authentication data can also be erased from the artifact, for example to ensure a single use. The physical artifact can be augmented with additional security features to validate its authenticity and to preclude duplication.

DETAILED DESCRIPTION OF THE INVENTION

Figure 1:
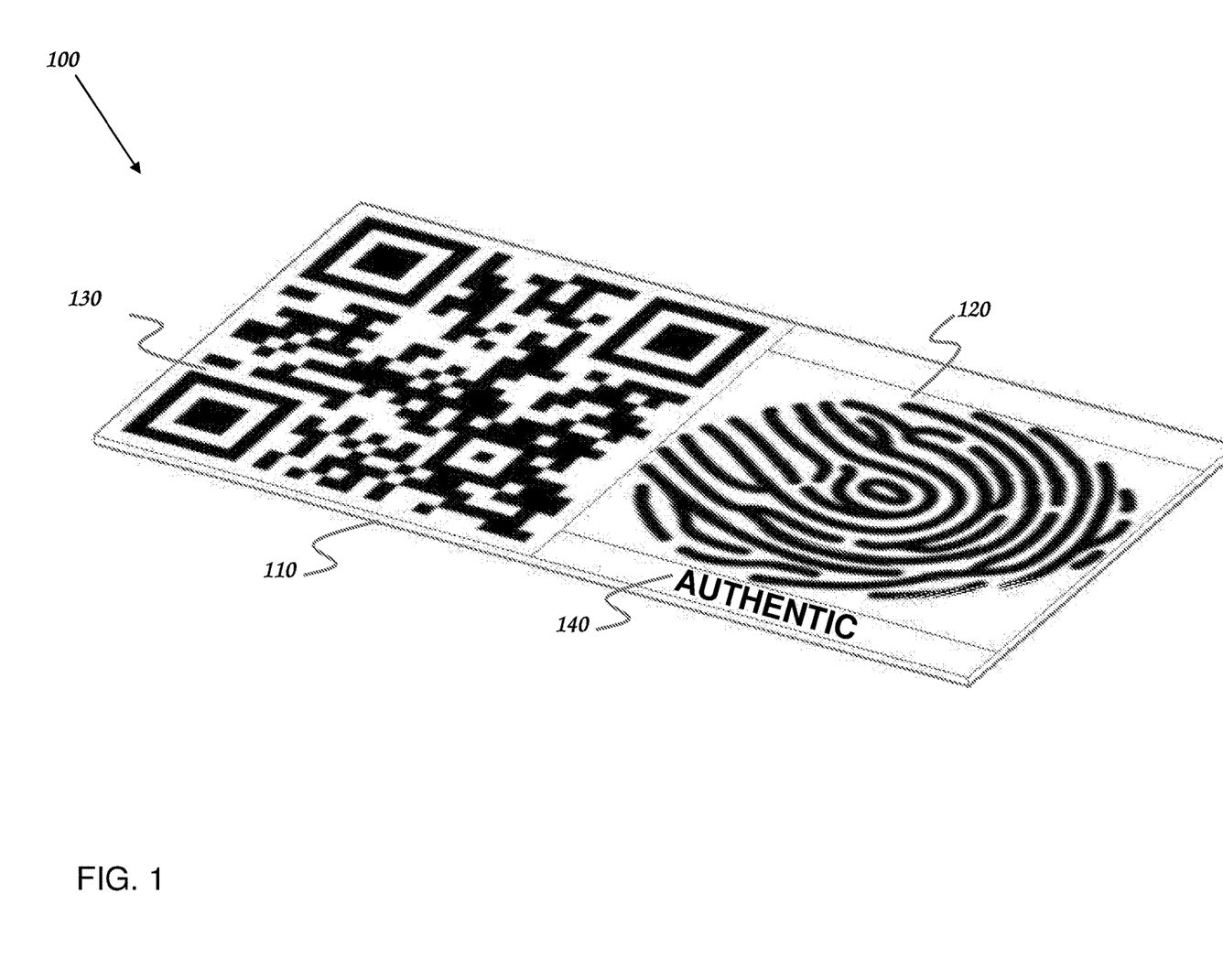
FIG. 1 is a diagram of a fingerprint artifact according to the present invention.

With reference to FIG. 1, a fingerprint artifact 100 according to the present invention comprises an electro-optical material 110 which includes fingerprint image 120 and security code image 130. An anti-counterfeiting feature 140 may also be incorporated into the electro-optical material 110 to validate its authenticity. A variety of anti-counterfeiting features 140 are known to skilled artisans and are widely employed in identification documents and currency notes. Some examples of these include holograms, inks which vary in color depending upon the viewing angle, watermarks, security ribbons, and raised printing. The security code image 130 is an optically-readable object which comprises digital data. Examples of such objects are known to skilled artisans including bar codes, QR codes, 2D barcodes, and proprietary graphical implementations. Smartphones, tablet computers, and other mobile devices having digital cameras are conveniently employed to capture an image of such optically-readable objects and to decode the data contained therein. The decoded digital data may be capable of being directly interpreted, for example as a world wide web URL (Universal Resource Locator) or the decoded data may be encrypted so as to be interpretable only by a system having a correct decryption algorithm.

Figure 2:
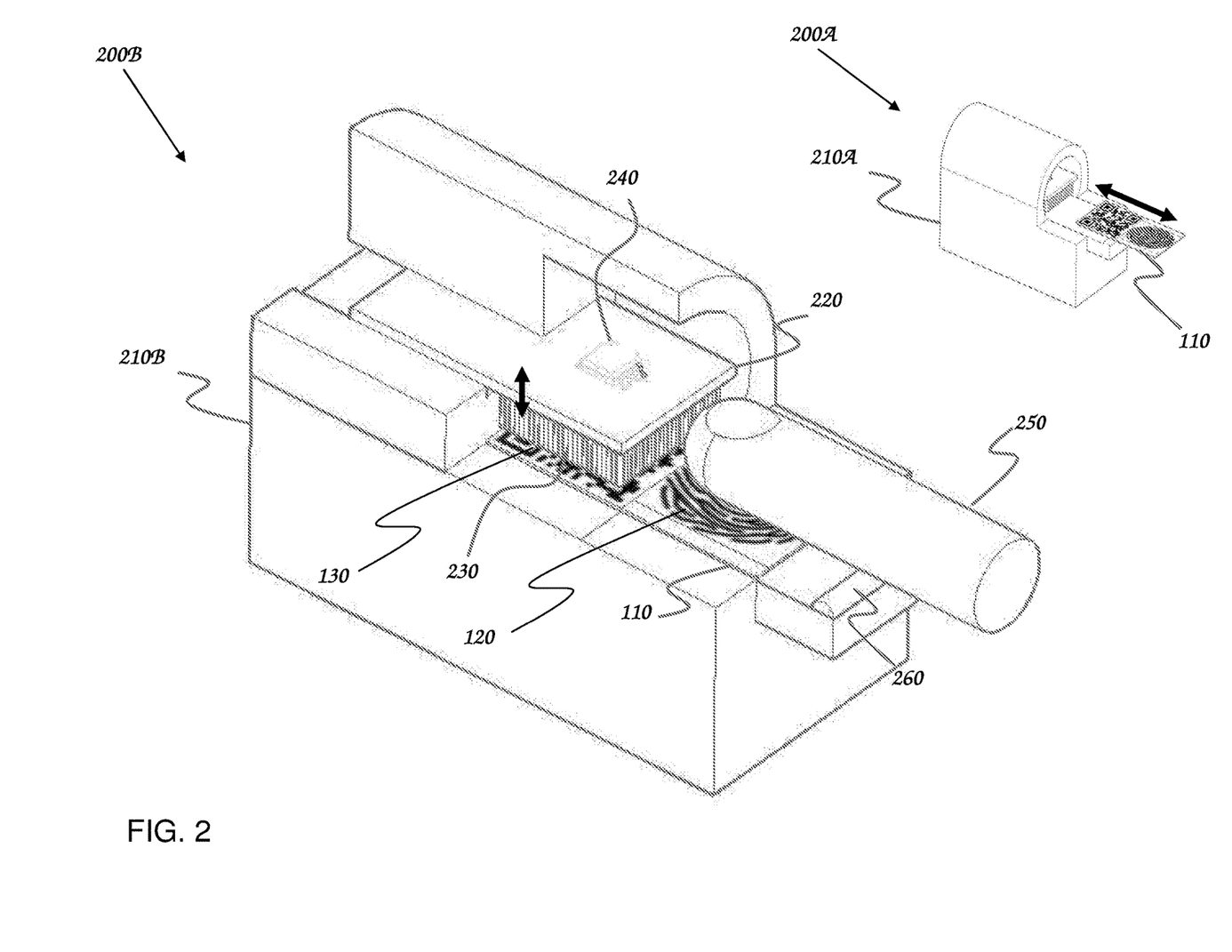
FIG. 2 is a fingerprint acquisition system according to the present invention.

The creation of fingerprint artifact 100 according to the present invention can be understood with reference to FIG. 2, an illustration of a fingerprint acquisition system incorporating security features. Fingerprint acquisition system exterior view 200A comprises fingerprint capture device 210A and electro-optical material 110. The electro-optical material 110 can be inserted and removed from fingerprint capture device 210A. In a typical use scenario, electro-optical material 110 would be in a blank initialized condition prior to insertion. Fingerprint capture device 210A would then record a fingerprint image and optically readable security image onto electro-optical material 110 which then be removed from fingerprint capture device 210A. In an additional use scenario, electro-optical material 110 may be inserted into fingerprint capture device 210A which could additionally incorporate means to optically read the fingerprint image and security image. Fingerprint capture device 210A could then optionally erase the security code image.

The features of the fingerprint acquisition system used for recording the optically readable security image are further detailed as fingerprint acquisition system interior view 200B comprising fingerprint capture device partial cross section 210B including printed circuit board 220 having electrical contacting pins 230 and having control circuitry 240. Printed circuit board 220 may be configured to move so as to enable electro-optical material 110 to be positioned beneath electrical contacting pins 220, followed by an additional movement of printed circuit board 220 so as to bring electrical contacting pins 220 into physical and electrical proximity to electro-optical material 110. During a fingerprint capture, finger 250 is brought into contact with electrode 260 and electro-optical material 110. Electrode 260 is coupled to a DC bias supply which is not shown to avoid obscuring the present invention. The electro-optical material 110 responds to contact by electrically biased finger 250 creating fingerprint image 120. Security code image 130 may be written any of before, during, and after the acquisition of fingerprint image 120, depending upon the availability of the desired security code data. Control circuitry 240 is coupled to electrical contacting pins 220 and to electro-optical material 110. Control circuitry 240 creates a pattern of electrical bias values on the electrical contacting pins 220. The pattern of bias values is transferred to electro-optical material 110 as optically readable security code image 130 by mechanisms previously discussed.

Skilled artisans will appreciate that optically readable security code image 130 can represent a wide variety of digitally-encoded data in a variety of formats. For example the encoded data may contain information associated with the captured fingerprint such as date, time, location, name of subject, and name of agency acquiring the fingerprint. In an exemplary embodiment of the present invention, fingerprint capture device 210A is equipped with a fingerprint image capture system according to methods discussed previously. The fingerprint image is digitally encoded and converted into biometric data using methods well known to skilled artisans. This digital encoding and biometric data conversion occur shortly after the fingerprint capture and prior to removal of the electro-optical material 110 from the fingerprint capture device 210A. In this way, the biometric data derived from the fingerprint are available to be incorporated into the digitally-encoded data comprising optically readable security code image 130.

Figure 3:
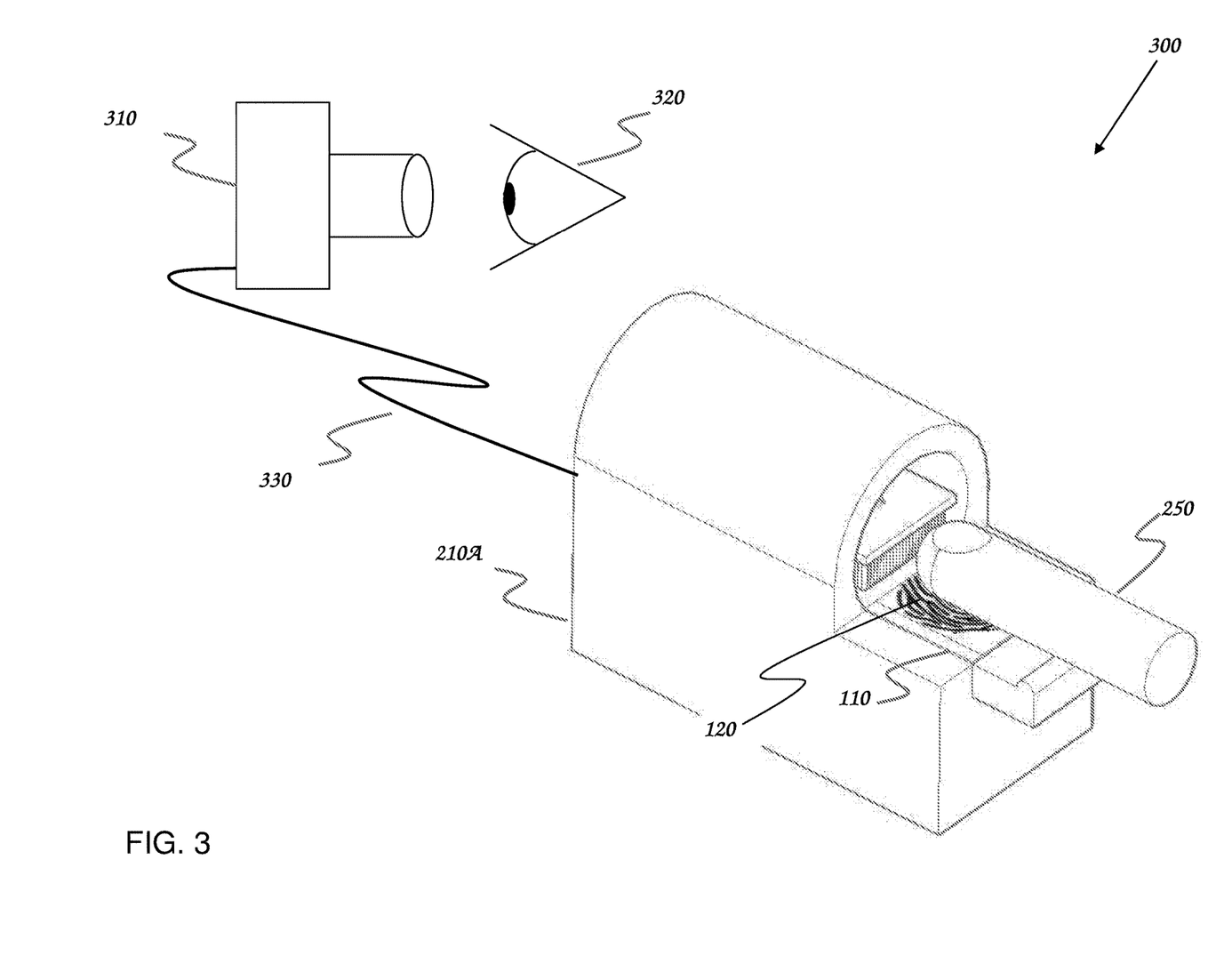
FIG. 3 is a fingerprint acquisition system having an iris scan augmentation according to the present invention.

Attention is now directed to FIG. 3, another exemplary embodiment of the present invention illustrating a fingerprint acquisition system with ocular scan 300. Eye scan device 310 is employed to take an image from subject eye 320. Eye scan device 310 may be a conventional CMOS or CCD camera employed to take an iris image of subject eye 320. In an alternative embodiment, eye scan device may be a retinal imaging device which captures an image of the retinal tissue and blood vessels internal to subject eye 320. Both iris scanning devices and retinal scanning devices are well known to skilled artisans for the purpose of biometric data acquisition, identification, and authentication. Following acquisition of an image using eye scan device 310, data are conveyed to capture device 210A by data link 330. Skilled artisans will appreciate that data link 330 may be a physical cable, such as a Universal Serial Bus (USB) cable, 1394 Fire Wire, an RS-232 serial connection, or other data connection. Data link 330 may also be implemented wirelessly, using a WiFi, Bluetooth, Near Field Communication (NFC), or other radio type connection. Biometric data derived from eye scan device 310 may be further encoded or processed in eye scan device 310, or said data may be encoded or processed in capture device 210A. A fingerprint capture and eye scan may be performed at approximately the same time, making the biometric data derived from the eye scan available to be incorporated into the optically readable security code image 130 prior to the removal of the electro-optical material 110 from capture device 210A.

Figure 4:
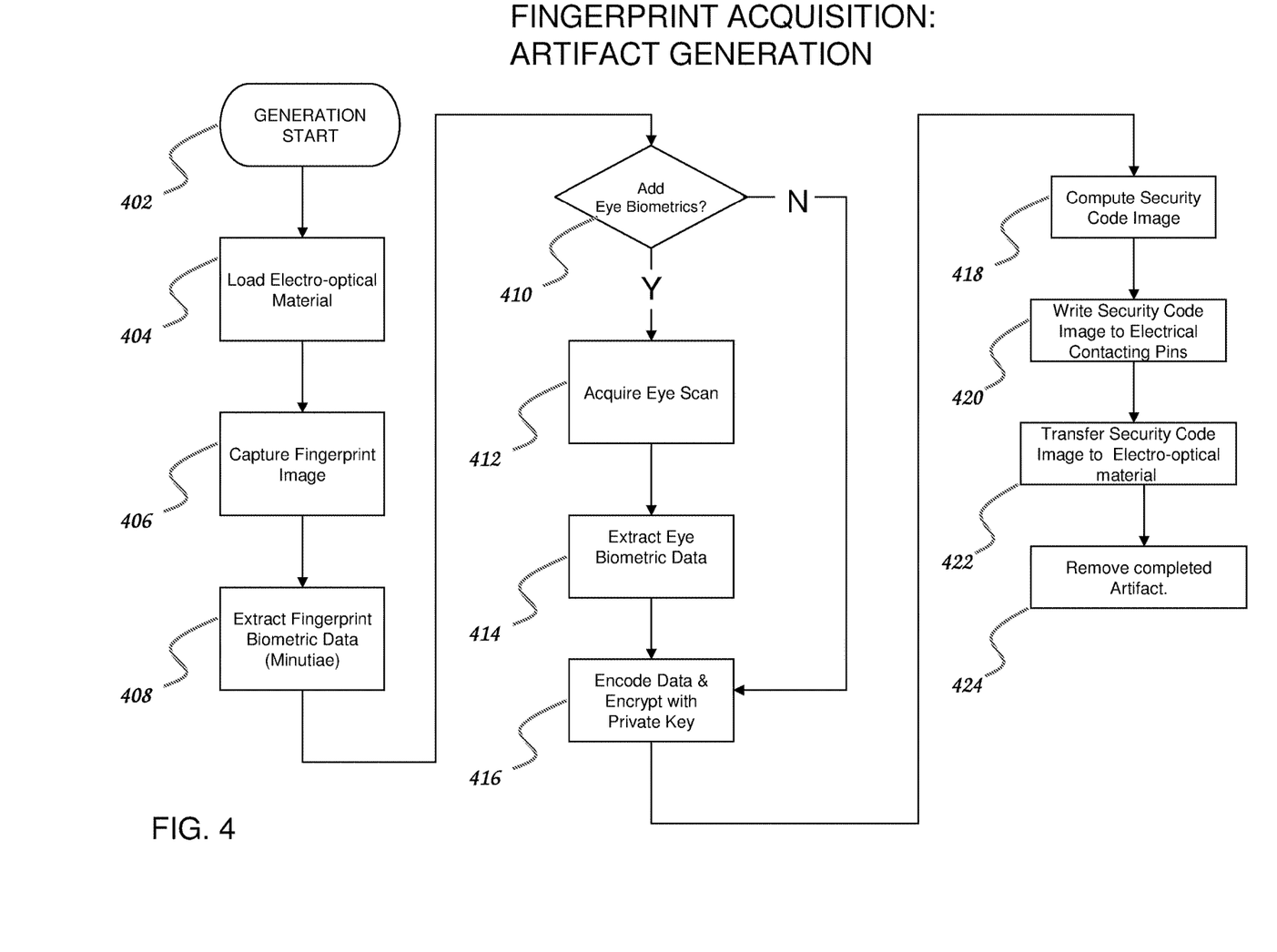
FIG. 4 illustrates a flow chart describing the creation of a fingerprint artifact according to the present invention.

Skilled artisans will appreciate that data of any type incorporated into the optically readable security code image 130 may be encrypted prior to writing said data, thereby increasing the difficulty of co-opting said data. Encryption methods known to skilled artisans may also be employed to authenticate the fingerprint artifact 100. The well known method of public key/private key encryption may be employed for this purpose: In yet another exemplary embodiment of the present invention, an agency (for example a national law enforcement branch of government) would encrypt the optically readable security code image 130 on fingerprint artifact 100 using its private key encryption code. Any interested party who wanted to confirm the authenticity of the written data would attempt to decrypt the optically readable security code image using the agency's published public key. If the data are successfully rendered readable, then the data are confirmed to originate from the agency publishing the key. The data origin for fingerprint artifact 100 is thereby confirmed. The presence of anti-counterfeiting feature 140 on fingerprint artifact 100 additionally confirms that fingerprint artifact 100 is itself an original, and not merely a copy made without knowledge of the encoded data content. With reference to FIG. 4, a flowchart for the creation of a fingerprint artifact using a fingerprint acquisition system according to an exemplary embodiment of the present invention, artifact generation start block 402 initiates a generation activity. Flowchart execution proceeds to load block 404 in which electro-optical material is loaded into the acquisition system The artifact generation process then proceeds to fingerprint capture block 406 in which a fingerprint image is captured from a subject on the electro-optical material, followed by conversion into an electronic format using any of the systems and methods previously discussed. The artifact generation process proceeds to fingerprint biometric data block 408 in which biometric data are extracted from the fingerprint image using methods well known to skilled artisans. In a particular embodiment of the present invention, the fingerprint image is analyzed to extract minutiae. These minutiae are well known to skilled artisans as major features of a fingerprint and comprise any of ridge endings, ridge bifurcations, independent ridges, islands, ridge enclosures, spurs, crossovers, deltas, and cores. The acquisition process now proceeds to eye biometrics decision block 410 where a choice is made to optionally include biometric data from an eye scan. If eye scan biometrics are not to be included, the process proceeds directly to encode and encrypt block 416, to be discussed infra. If eye biometric data is desired, the acquisition process proceeds from eye biometrics decision block 410 to eye scan block 412. During eye scan block 412, an eye scan is performed on the subject. As discussed supra, the eye scan may be an iris image or a retinal image. Artifact generation proceeds to eye biometric data block 414 in which biometric data are extracted from the eye scan image acquired. Execution now proceeds to encode and encrypt block 416. Here data from fingerprint biometric data block 408 are encoded by formatting and optionally combining with other desirable data such as subject name, date, time, social security number, or other information traditionally employed for identification and authentication purposes. If data are present from eye biometric data block 414, those data are encoded as well. Many processes for encoding data are known to skilled artisans. For example, data from various sources may be represented in ASCII (American Standard Code for Information Interchange) format and concatenated in a predefined order to create a known data encoding sequence. In an exemplary embodiment of the present invention, the encoded data are then encrypted using the private key of a public key/private key encryption system. Public key/private key encryption methods are well known to skilled artisans. By employing a private key to encrypt the data in encode and encrypt block 416, an agency controlling the artifact generation process can effectively "sign" the artifact. The artifact can be decoded by anyone using the public key of the agency (to be discussed with reference to FIG. 5 infra). As long as the private key of the agency is uncompromised, the agency is unique in its ability to encrypt data on the artifact, thereby proving its point of origin.

Once the data have been encoded and encrypted, artifact generation proceeds to security code computation block 418. The encrypted data is converted to a security code image which represents the data as an optically readable image. A particularly well known example to skilled artisans is the QR code, which can represent hundreds or even thousands of characters, depending on the QR code configuration. Methods for computing QR codes are widely available as smart phone apps or computer programs. A variety of public domain and proprietary optically-readable codes based on similar operating principles are also known.

The computed security code is now transferred to write security code block 420. Control circuitry within the fingerprint acquisition system converts the code into a pattern of on/off voltages on electrical contacting pins such that the pattern of voltages has a physical correspondence to the desired image of the security code image. The security code image is written to the electro-optical material in transfer security code image block 422 by bringing the electrical contacting pins into proximity with the electro-optical material. Artifact generation is now complete and progresses to remove artifact block 424.

Figure 5:
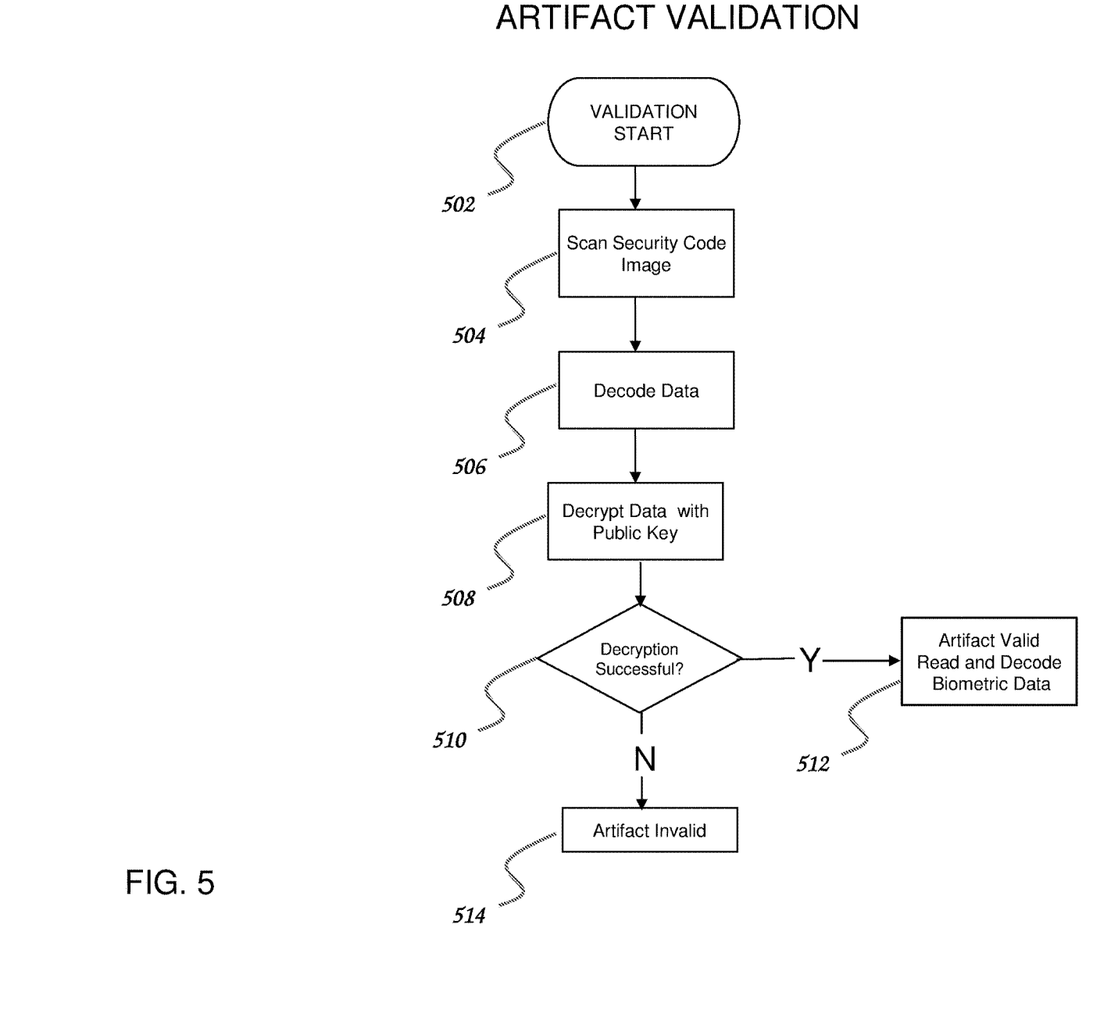
FIG. 5 illustrates a flow chart describing the validation of a fingerprint artifact according to the present invention.

With reference to FIG. 5, a flowchart for the validation of a fingerprint artifact according to an exemplary embodiment of the present invention, validation start block 502 initiates a validation activity. Execution progresses to scan security code block 504 during which an optical image is taken of the fingerprint artifact security code image 130. This optical image can be acquired by any of a plurality of means well known to skilled artisans. One example of a common image acquisition device is the CMOS imager commonly found in smart phones used for taking photographs. Another common image acquisition device is a flatbed scanner used for office document input into personal computers. The scanned security code image is passed to decode data block 506 where the image is analyzed using methods well known to skilled artisans to recover the data which was originally employed in the creation of the image. One example of this is the recovery of ASCII data characters from a QR code.

Following the data recovery from the security code image, the data are still encrypted and appear as a random series of characters or numbers. Execution progresses to decrypt data block 508 where the decoded data are attempted to be decrypted using methods well known to skilled artisans. In this exemplary embodiment of the present invention, the data are decrypted using the public key associated with the agency attributed to the creation of the fingerprint artifact. Execution proceeds to decryption success decision block 510. Data decryption algorithms employ a variety of means for assessing the validity of a decryption process including, for example, cyclic redundancy checks (CRC's), parity bits, checksums, hash functions, and other means known to skilled artisans. The decryption process using the selected public key is subjected to one or more validity tests, and the decryption process is declared successful or unsuccessful. If the decryption process is declared successful, execution progresses to artifact valid block 512. The arrival of the flowchart execution at this point signifies that the fingerprint artifact is valid and that the agency responsible for its creation is absolutely determined. Optionally, the fingerprint image on the artifact can be compared with the fingerprint of the person presenting the artifact, since the acquiring agency has been authenticated and the data on the artifact certified. The artifact can now be accepted for further identification purposes, for example to allow the possessor to vote or to access and fire a weapon system. If the decision from decryption success decision block 510 is negative, signifying that the decryption was not successful, flowchart execution proceeds to artifact invalid block 514. Here the fingerprint artifact is determined to have not originated from the claimed authority. The entity checking the fingerprint artifact then takes whatever actions are specified for an invalid identification.

Although an exemplary embodiment of the present invention has been described supra with respect to a specific instance of public key/private key encryption, skilled artisans will appreciate that other embodiments are possible. For example, the security code image may be created without any encryption, or it could be created with a public encryption key. If a public key encryption were employed for the security code image, then only the agency possessing the corresponding private encryption key could read the encoded data. This could be used as a method to convey a secure message to the agency having the private key, while the corresponding biometric data on the fingerprint artifact would guarantee the authenticity of the message courier.

Figure 6:
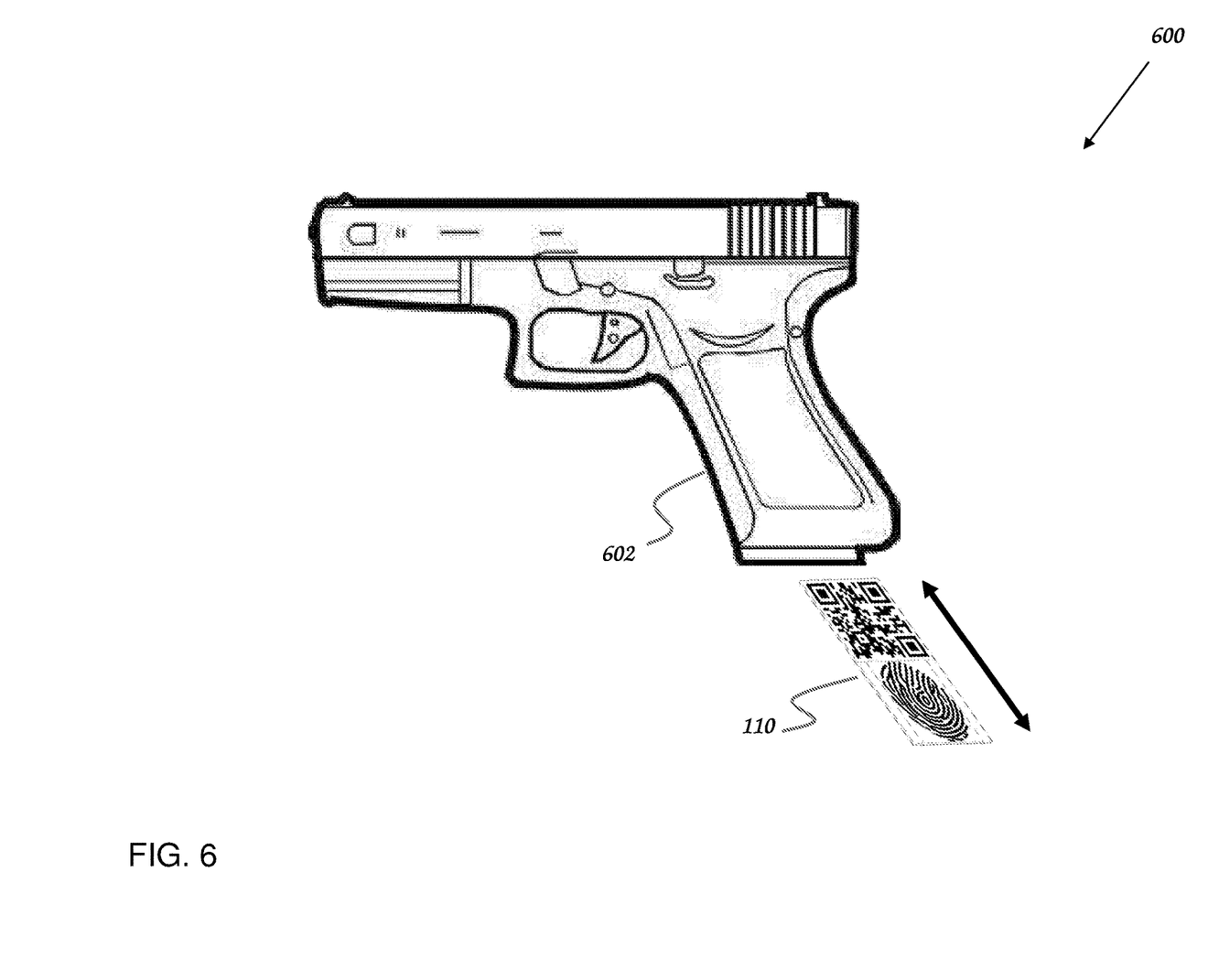
FIG. 6 is a secure weapon system incorporating fingerprint artifact validation according to the present invention.

The mechanism performing the artifact validation as described by the flowchart of FIG. 5 could be implemented as a portion of a larger system. With reference to FIG. 6, a secure weapon system 602 incorporates a fingerprint artifact scanner as described supra. Fingerprint artifact 110 is inserted into secure weapon system 602 to enable the device and is removed to prevent unauthorized use of the device. Secure weapon system 602 would validate the fingerprint artifact 110 as detailed in the flowchart illustrated in FIG. 5. Additionally, the biometric data successfully decrypted from the fingerprint artifact 110 could be optionally compared with real-time biometric data from the potential user of the weapon before allowing the system to activate.

In the foregoing specification, the present invention has been described with reference to specific embodiments thereof. It will, however, be evident to a skilled artisan that various modifications and changes can be made thereto without departing from the broader spirit and scope of the present invention as set forth in the appended claims. For example, although the apparatus and method of the present invention is described primarily in reference to discrete devices for the creation and validation of a fingerprint artifact, the systems and hardware so described may be incorporated into other devices and systems. As an illustration, the fingerprint acquisition and secure image creation may be incorporated into a smartphone or tablet device, while the validation system may be part of the locking mechanism of a building or automobile. Additionally, other encryption and data validation methods could be used in place of the public key/private key method described. The specification and drawings are, accordingly, to be regarded in an illustrative rather than a restrictive sense.

What is claimed is:
1. A method comprising:
    securing a static fingerprint image on a surface of a removable artifact comprising an electro-optical material and being capable of being any of inserted and removed from a fingerprint capture device:
    acquiring a fingerprint image on a first portion of a free surface of an electro-optical material, wherein acquiring a fingerprint image comprises placing at least a portion of a finger on the tree surface of the electro-optical material, and wherein the electro-optical mate- rial operably retains the image after removal of the at least a portion of the finger from the free surface of the electro-optical material;
computing a security code; converting the security code into a series of electrical potentials on an electrode array; and coupling the electrode array to a second portion free surface of the electro-optical material to produce a security code image, wherein the security code image containing encrypted biometric data.

2. The method of claim 1, wherein the electro-optical material is an electrophoretic material.

3. The method of claim 1, wherein the security code is encrypted.

4. The method of claim 1, wherein the security code image is any of a QR code and a bar code.

5. The method of claim 1, wherein the security code incorporates biometric data from any of an eye scan and analysis of the acquired fingerprint image.

6. The method of claim 1, further comprising an anti-counterfeiting feature.

7. The method of claim 1, wherein the electro-optical material is an electrophoretic material and the security code image is derived from biometric data analysis of any of an eye scan and the acquired fingerprint image.

8. A method for validating an identification artifact including a static fingerprint image, the identification artifact further comprising an electro-optical material and being capable of being any of inserted and removed from a fingerprint capture device, wherein the static fingerprint image is acquired by placing at least a portion of a finger on a free surface of the electro-optical material, and wherein the electro-optical material operably retains the image after removal of the at least a portion of the finger from the free surface of the electro-optical material, the method comprising:
capturing an electronic image of a security code on the identification artifact;
decoding encrypted data incorporated into the security code;
attempting to decrypt the encrypted data;
determining if the decryption process was successful; and
coupling an electrode array to a free surface portion of the identification artifact comprising the security code and applying a series of electrical potentials to the electrode array in order to any of alter and/or erase the security code.

9. The method of claim 8 wherein the data are encrypted with an encryption private key and decrypted with a public key.

10. A method for validating an identification artifact including a static fingerprint image, the identification artefact further comprising an electro-optical material and being capable of being any of inserted and removed from a fingerprint capture device, wherein the static fingerprint image is acquired by placing at least a portion of a finger on a free surface of the electro-optical material, and wherein the electro-optical material operably retains the image after removal of the at least a portion of the finger from the free surface of the electro-optical material, the method comprising: capturing an electronic image of a first security code on the identification artifact; capturing a new fingerprint image of a person presenting the identification artifact and computing a second security code from the new fingerprint image; optionally capturing an electronic image of the fingerprint on the identification artifact and computing a third security code from the electronic image of the fingerprint; comparing any of the first security code, the second security code, and the third security code to determine if a match exists; coupling an electrode array to a free surface portion of the identification artifact comprising the first security code; and applying a series of electrical potentials to the electrode array in order to any of alter and erase the first security code.

11. A system for validating a secure fingerprint artifact, the secure fingerprint artifact further comprising an electro-optical material and being capable of being any of inserted and removed from a system device, wherein the secure fingerprint artifact comprises a static fingerprint image that is acquired by placing at least a portion of a finger on a free surface of the electro optical material, and wherein the electro-optical material operably retains the image after removal of the at least a portion of the finger from the free surface of the electro-optical material, the system comprising:
means for inputting the secure fingerprint artifact; means for reading a security code image on the fingerprint artifact; means for decoding data from the security code image;
means for executing a decryption operation on the decoded data; means for determining if the decryption operation was successful; means for coupling an electrode array to a free surface portion of the secure identification artifact comprising the security code; and means for applying a series of electrical potentials to the electrode array in order to any of alter and erase the array.

12. The system of claim 11 wherein the system is a weapon.

* * * * *